United States Patent [19]

Lederman

[11] Patent Number: 5,507,094
[45] Date of Patent: Apr. 16, 1996

[54] WHEEL BEARING ASSEMBLY WITH DUAL TELESCOPING OUTER RINGS AND IMPROVED LOAD SUPPORT

[75] Inventor: Frederick E. Lederman, Sandusky, Ohio

[73] Assignee: General Motors Corporation, Detroit, Mich.

[21] Appl. No.: 285,671

[22] Filed: Aug. 4, 1994

Related U.S. Application Data

[63] Continuation-in-part of Ser. No. 72,378, Jun. 7, 1993, abandoned.

[51] Int. Cl.⁶ ..................................................... F16C 13/00
[52] U.S. Cl. ..................... 29/898.061; 29/898.064; 384/500; 384/504; 384/511; 384/519; 384/537; 384/544
[58] Field of Search ....................... 29/898.061, 898.064, 29/898.06; 384/499–505, 510–512, 517, 519, 520, 537, 543, 544

[56] References Cited

U.S. PATENT DOCUMENTS

| | | | |
|---|---|---|---|
| 1,643,982 | 10/1927 | Delaval-Crow | 29/898.061 |
| 4,179,167 | 12/1979 | Lura et al. | 308/189 A |
| 4,563,099 | 1/1986 | Brandenstein et al. | 384/519 |
| 4,569,602 | 2/1986 | Lundgren | 384/499 |
| 4,723,851 | 2/1988 | Troster et al. | 384/544 |
| 5,172,984 | 12/1992 | Lederman | 384/489 |
| 5,175,931 | 1/1993 | Ito | 29/898.061 |
| 5,195,807 | 3/1993 | Lederman | 301/108.1 |
| 5,209,701 | 5/1993 | Ishikawa et al. | 384/544 |
| 5,226,737 | 7/1993 | Sandy, Jr. | 384/544 |

*Primary Examiner*—Larry I. Schwartz
*Assistant Examiner*—Marc W. Butler
*Attorney, Agent, or Firm*—Patrick M. Griffin

[57] ABSTRACT

A wheel spindle and bearing assembly for either a non-drive or driven wheel of a vehicle includes a unitary spindle of substantially constant diameter along the bearing section which includes dual raceways formed in the outer surface. Dual annular arrays of antifriction elements are seated in the raceways and are held captive by dual outer support rings, thus providing relative rotation between the spindle and the rings. The support rings are preferably mounted for telescoping movement relative to each other between a retracted position in the direction of the axis of the spindle to allow loading of the antifriction elements and an axially extended position for applying an opposed, axial preload force to the bearing assembly. In the axially extended position the rings form a gap between opposed faces and a split, annular keeper is positioned in the gap and held in compression to secure the entire assembly. The cross section area of the keeper is slightly larger than the gap to establish the preload force.

1 Claim, 4 Drawing Sheets

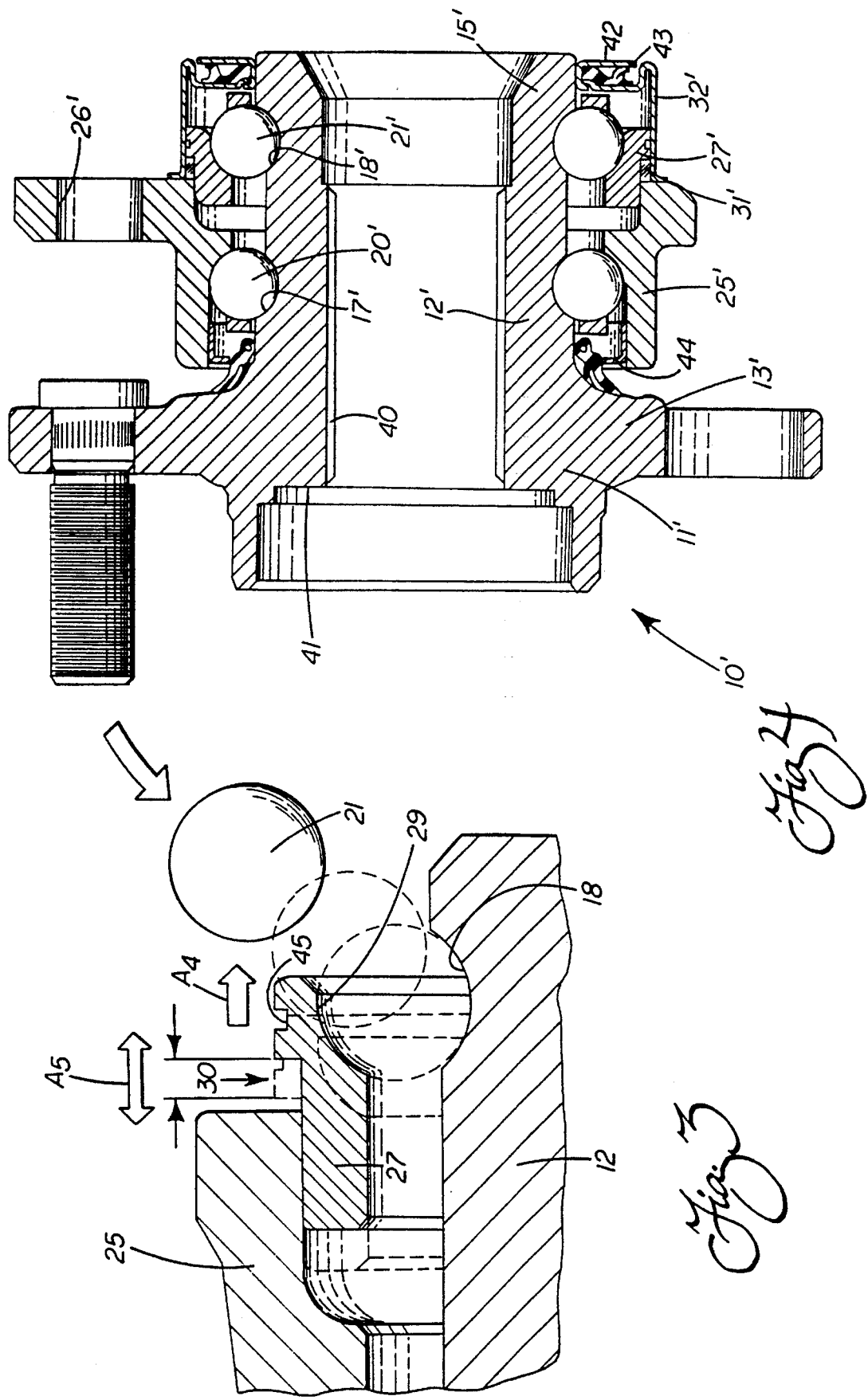

WHEEL BEARING ASSEMBLY WITH DUAL TELESCOPING OUTER RINGS AND IMPROVED LOAD SUPPORT

CROSS REFERENCES TO RELATED APPLICATIONS

This application is a continuation in part of co assigned U.S. Ser. No. 08/072,378, filed Jun. 7, 1993 abandoned.

TECHNICAL FIELD

The present invention relates to spindle/bearing assemblies for wheeled vehicles, and more particularly, to a spindle and wheel bearing assembly that is characterized by design simplicity and improved ease of fabrication and assembly, and improved load support and compactness.

BACKGROUND OF THE INVENTION

Angular contact, double row ball bearings have a pair of inner and outer, coaxial races, each of which has a pair of ball pathways. The two ball pathways on one race face axially outwardly, and are closer together axially, while the two ball pathways on the opposite race face axially inwardly, and are spaced father apart axially. Each pathway on each race is diagonally opposed to a pathway on the opposite race, with a row of balls engaged between each opposed pathway pair. The clearance between the opposed pathway pairs, which has a radial and axial component, must be less than a ball diameter. By diagonally opposed, it is meant that the opposed pathway pair engages opposed quadrants on the balls in its row, and the ball contact areas (narrow annuli) on the opposed pathways lie on a cone. This can easily be seen in the coassigned patent to Lura et al., U.S. Pat. No. 4,179,167. Referring to FIG. 1, the closer, axially outwardly facing pathways 38 and 40 lie on the outer race (hub) 34, while the axially inwardly facing pathways 22 and 48 are on the inner race (spindle) 14. In such a configuration, the two contact cones, shown by dotted lines, converge and intersect at a medial plane located between the ball rows 44 and 46. The other possible angular contact configuration would have the axially outwardly facing pathways on the inner race, in which case the contact cones would diverge. That configuration is not very common or practical in most bearing applications.

In any angular contact bearing, convergent or divergent, one ball row is installed last. The last installed ball row can be installed by the so called Conrad technique, in which one race is pulled eccentric with respect to the other, creating a crescent shaped space between them that is larger than the ball diameter over a limited angle. Balls may be inserted at the larger, wider part of the crescent in a bunched up pattern, then spaced out evenly and caged after the races are returned to a concentric orientation with the original, smaller pathway clearance. However, a full complement of balls cannot be installed this way, so load capacity is often unacceptable. To install a full complement of balls in the last installed row, a separate race piece is provided that incorporates one of the ball pathways. This is done in Lura, where the separate race piece 50 incorporates the outermost, axially inwardly facing pathway 48 of the last installed ball row 46. It is a relatively simple matter to install the separate race piece when it incorporates an axially inwardly facing pathway, as it may simply be pushed axially in after the last ball row 46 is installed, and then fixed in place. The separate race piece 48 makes solid, continuous contact with the hub 14, so the contact cone of the ball row 46 intersects solid, load supporting metal at all critical points.

It is also known, in an angular contact bearing, to instead incorporate an axially outwardly facing ball pathway in the separable race piece, rather than the axially inwardly facing pathway. This is a more difficult technique, since the outwardly facing ball pathway is axially inboard of, not outboard of, the last installed ball row. Therefore, the separable race piece has to be first pushed axially into the race to which it will ultimately be fixed, after which the last ball row is installed. Finally, the separable race piece is pulled axially back out against the last ball row. The separate race piece is then fixed in place. Thus, the axially outwardly facing pathway can, in effect, be installed "behind" and inside of the last installed ball row.

A known bearing design that incorporates an axially outwardly facing ball pathway as part of a separate piece is shown in U.S. Pat. No. 4,569,602 to Lundgren. Structural compromises are made to allow assembly in that fashion, however, which make the design unacceptable in terms of load support, and which also make for a non compact design, characteristics either of which would make the basic design impossible to use as a vehicle wheel bearing or any other substantial load bearing application. An embodiment from the Lundgren patent is reproduced in FIG. 5 to illustrate.

Referring to FIG. 5, a basic, two row angular contact bearing includes a ball row 21" which is installed last, and which is engaged between an axially inwardly facing pathway 18" on inner race 11" and an axially outwardly facing pathway 29", which is incorporated in a separate race piece 27". The contact cone for the ball row 21" is shown at C, and the pitch plane, which is a plane through the pitch circle of ball row 21" and perpendicular to the central axis, is indicated at P. In addition, an imaginary cylindrical surface which establishes the radially outermost extent of the ball row 21" is indicated at $O_R$, and a plane which establishes its axially outermost extent is indicated at $O_A$. The cylindrical inner surface 46 of the outer race 25" extends axially out substantially beyond the pitch plane P to an edge 48, and it is substantially radially spaced from $O_R$, by almost a full diameter of a ball 21". The cylindrical outer surface 50 of separate race piece 27" extends axially from a point substantially outboard of pitch plane P to a point just barely inboard of edge 48, with a gap 30" therebetween. Although not illustrated, gap 30" would be filled with a ring or the like to keep ball row 21" firmly engaged between the pathways 18" and 29". Gap 30" is large enough to in turn allow separate race piece 27" to be pushed axially into outer race 25" far enough to create enough clearance between the pathways 18" and race piece 27" to allow the ball row 21" to be installed between them. However, because edge 48 is located so far axially outboard, flange 52 has to be located even farther outboard of the plane $O_A$ in order to allow a large enough gap 30". This lack of compactness in the axial direction is compounded. Because flange 52 is located so far axially outboard, surface 50 in turn has to be located substantially radially outboard of $O_R$. Otherwise, shifting flange 52 axially in would still not allow enough total axial and radial clearance between the pathways 18" and 29" for the ball row 21" to clear. Worse than the lack of compactness is the fact that there is very little axial overlap, indicated at X, between the outer race surface 46 and the separate race piece surface 50. What overlap there is lies outboard of the pitch plane P, so that the contact cone C passes through no solidly contacting bearing material at all. As a consequence, the bearing is essentially useless for any load bearing application, such as a vehicle wheel bearing.

It is, therefore, a general object of the invention to provide an angular contact bearing which can be assembled by placing the axially outwardly facing pathway for the last installed ball row on a separate, slidable race piece, but with enough strategically placed solid contact between the outer race and the separate race piece to allow for good load support.

It is another object of the invention to provide such a bearing that is axially and radially compact.

SUMMARY OF THE INVENTION

A wheel spindle/bearing assembly is provided for either a non-driven or driven wheel for a vehicle including a unitary inner race or spindle for support of the vehicle from the associated wheel and having dual, axially inwardly facing pathways formed on the outer periphery of the bearing section of the spindle. Dual annular arrays of antifriction elements, such as bearing balls, are positioned to engage these pathways. Dual outer support rings together form an outer race or hub with cooperating, axially outwardly facing pathways to hold the antifriction elements captive and to provide the relative rotation between the support rings and the spindle. Typically, the spindle includes a flange for mounting of the wheel and brake disc, and thus the spindle is the component that rotates; however, it should be understood that all that is required is relative rotation between the component parts in accordance with the broadest aspects of the present invention. Also, a feature of the present invention is that the bearing assembly, including the novel aspects of the present invention can be utilized in other environments where rotary, antifriction bearing support is required.

In accordance with an important aspect of the present invention, the dual support rings are mounted for axial movement of one within the other parallel to the axis of rotation. When positioned so as to be retracted with respect to each other, the total clearance between one pair of the pathways is sufficient to allow easy loading of the last installed row of antifriction elements. Then, when the rings are moved to the axially extended position, the antifriction elements are securely retained in position, and the contact cone therefor intersects an area of solid contact between the rings. In addition, when in the extended position an outwardly opposed preload force across the bearing assembly can be easily applied.

In the preferred embodiment, the support rings are mounted for telescoping movement relative to each other. The telescoping relationship advantageously provides the requisite strength to the bearing assembly in accordance with the particular design specifications, but most importantly provides for substantially improved design simplicity and the ease of fabrication/assembly that characterizes one of the important aspects of the present invention. Once the support rings are extended to the final outwardly extended position, and the design axial preload force is applied, the entire assembly can be secured in a very efficient manner. Specifically, the preferred securing means includes a gap formed between opposed faces of the rings and a split, annular keeper positioned in the gap and held in compression so as to tend to force the rings apart. The annular keeper is a hardened component piece that has been machined to close tolerances, so that just the right amount of axial preload force can be assured, while at the same time securing the entire assembly in a very efficient manner is accomplished.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing:

FIG. 3 is an enlargement of a portion of FIG. 2 and illustrating the manner in which the telescoping support rings are utilized to easily load the antifriction balls;

FIG. 4 is a cross sectional view illustrating the manner in which the same features of the present invention are applied to a spindle/bearing assembly for a driven wheel of a vehicle.

DESCRIPTION OF THE PREFERRED EMBODIMENT

Figure 1:
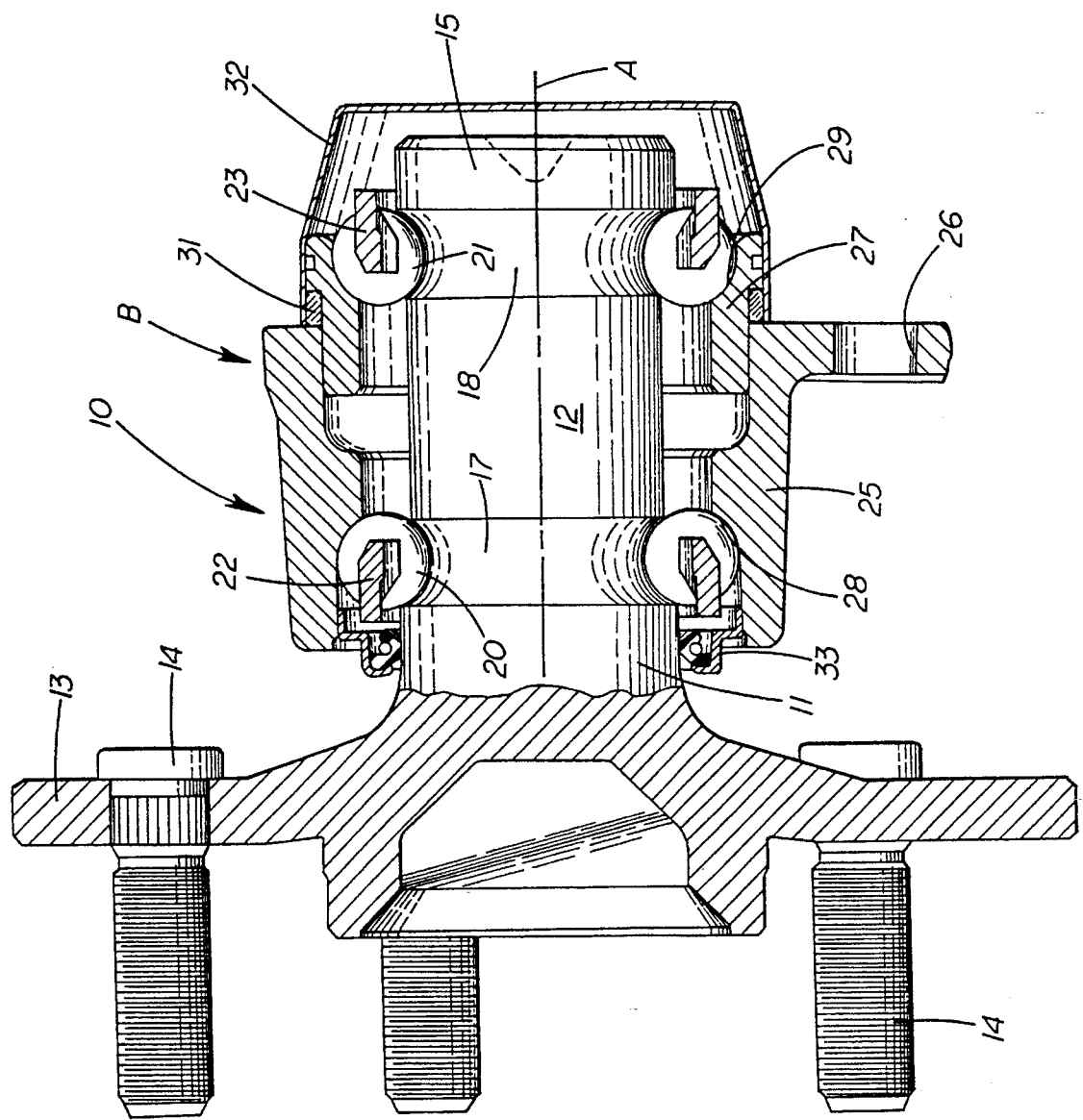
FIG. 1 is a cross sectional view of a wheel spindle/bearing assembly for a vehicle and constructed in accordance with the present invention and specifically adapted for supporting a non-driven wheel.

With reference now specifically to FIG. 1, there is illustrated a spindle and bearing assembly (10) for a non-driven wheel of a vehicle. The wheel spindle/bearing assembly (10) includes an inner race or spindle (11) having a bearing section (12) at one end and a radially extending flange (13) at the other end, which includes mounting studs (14). As is typical in this art, the flange (13) accommodates mounting of both the vehicle wheel and brake disc, neither of which is shown in the drawings. As illustrated, the spindle is of a unitary design with the bearing section (12) having a substantially constant diameter throughout its length including all the way to distal end (15). The only machining required along the bearing section (12) is the formation of dual, pathways (17,18). The portion of the pathways that makes load bearing contact with the anti friction elements faces axially inwardly. At this point, it is noted that in accordance with the broader aspects of the present invention, the pathways (17,18) could be provided by typical annular races (other than around the bearing section (12) of the spindle (11)), and in this instance a separate antifriction bearing assembly, generally designated by the reference indicia B, is provided. In either instance, the novel features providing for the overall design simplicity, ease of fabrication and assembly, as well as all of the other objectives of the invention are obtained.

As will be apparent, the dual pathways (17, 18) engage dual annular arrays or rows of antifriction elements (20,21), respectively. As shown in the preferred embodiment, the elements (20,21) are balls and are appropriately circumferentially spaced and retained by cages (22,23). The left hand row (20) is installed first, and the right hand row (21) last, as will appear below.

A first support ring (25), which constitutes the structural foundation of an outer race or hub, is provided for mounting the spindle/bearing assembly (10) to a non-rotating, but typically spring suspended part of the vehicle. Fastener receiving apertures (26) (one shown in FIG. 1) may be provided for this mounting function. A second outer ring (27) in the form of a separate race piece cooperates with the first outer ring (25) to form a complete outer race or hub, as also clearly shown in FIG. 1. Together, the rings (25,27) form dual outer support rings in which pathways (28,29), respectively, are machined, with pathway (29) being machined in the separate race piece (27). In accordance with preferred current motor vehicle practice, the contact angles of the pathways (28,29) are convergent along the axis A of the spindle bearing section (12), or in other words, the pathways (28,29) face in an outwardly, opposed manner in the axial direction. This orientation of the pathways (28,29) allows for the desired preload application and control of the bearing assembly B, as will be explained in full detail below.

Advantageously, the dual outer support rings (25,27) are interconnected and mounted in a particular way that provides improved results and advantages in a number of important aspects. Not only are the design specifications for a particular vehicle easy to attain, but this is accomplished by a simple design utilizing a minimum number of parts and providing for substantially increased ease of fabrication, assembly and related gauging and inspection procedures.

Figure 2:
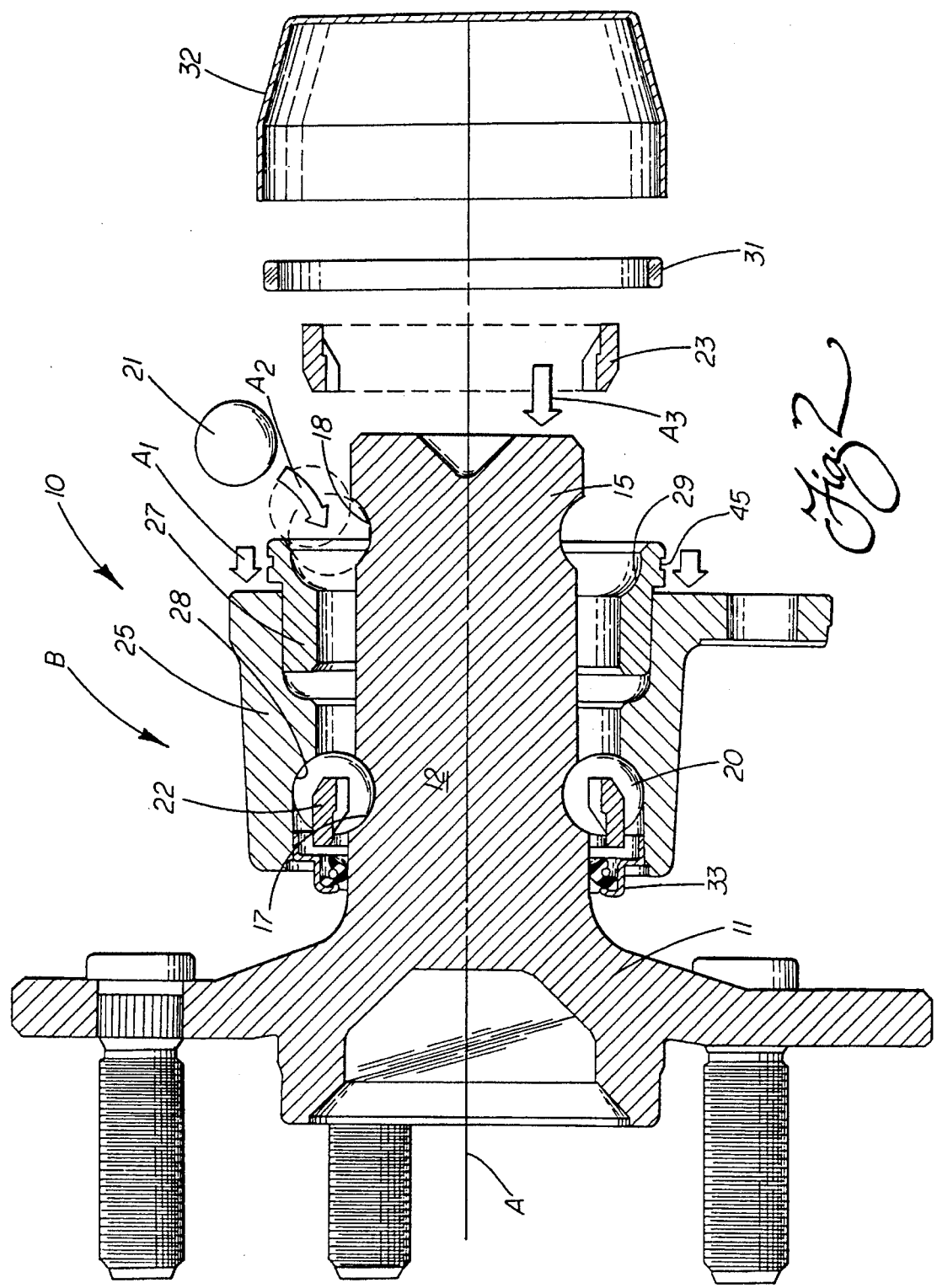
FIG. 2 is an additional cross sectional view taken through the spindle/bearing assembly with one of the annular array of antifriction balls already assembled and the other being shown in an exploded view illustrating the preferred method of assembly.

Specifically, as best shown in FIG. 2, the outer support rings (25,27) are mounted for telescoping movement relative to each other, and in the first instance movement is allowed to a retracted position in the direction of the axis A of the spindle (11) (note the action arrow $A_1$ in FIG. 2). Once the support rings (25,27) are telescopingly retracted, the axial clearance between the mating pair of first and second pathways (18,29), adjacent the distal end (15) provides sufficient clearance for easy loading the antifriction balls (21) (note the action arrow $A_2$).

Although the method of assembly of the bearing assembly B forms a part of the present invention and will be described in more detail below, suffice it to say at this point that the balls (21) are loaded one-by-one along the path of the arrow $A_2$, and as shown by the dashed line outlines in FIG. 2. Alternatively, since the space between the pathways (18,29) required for loading is a circle, a full array of antifriction balls may be inserted at one time. In any case, when a full array of antifriction balls are in position around the perimeter of the pathway (18), the bearing cage (23), which has receiving slots for the individual balls (21), is used to properly space them around the perimeter. The cage (23) is usually made of a suitable, molded plastic material. It can be moved axially into position over the distal end (15) of the spindle (11) until the entire array of balls (21) is captured (compare with FIG. 1). The axial movement of the cage (23) is represented by the action arrow $A_3$ in FIG. 2.

Once the array of antifriction balls (21) is in position and held captive between the opposed pair of pathways (18,29), the dual rings are telescopingly shifted to the axially extended position, as shown by the action arrow $A_4$ in FIG. 3. Once in this position, not only is the array of antifriction balls (21) held in position and secured in place, but also the array of balls (20) previously loaded between the pair of pathways (17,28) is also now secured.

Since the dual pathways (28,29) diverge outwardly in the direction of the axis A, the outward, telescoping movement, as represented by the action arrow $A_4$ in FIG. 3, is effective to capture and hold the balls (20,21) in the assembly in a very efficient manner. The movement required to allow the loading and capture of the balls (21) is depicted by the opposed arrow $A_5$, also represented in FIG. 3.

The telescoping interface between the dual support rings (25,27) is preferably a tight interference fit. If desired, heat can be applied during assembly to the ring (25) in order to provide sufficient clearance for initially receiving the ring (27). Once the support ring (25) cools, a tight, secure relationship along the extended annular interface is provided, giving substantially the same performance as an integral outer support ring gives.

In accordance with another important feature of the present invention, during the assembly process, the expanding telescoping movement (see action arrow $A_4$ in FIG. 3) is effected in such a way as to provide the desired preload force to the spindle/bearing assembly (10), as mentioned above. In this manner, just the right amount of end-play is designed into the bearing B. The adjustment is instrumental in providing optimal rolling contact, load distribution and deflection rate to satisfy the overriding objective of supporting the weight of the vehicle in the most efficient manner. To best obtain this result, the ball rolling contact action within the pathways is calculated to give true rolling, non-skid relative movement with maximum antifriction action. To provide the desired load distribution, the preloading is calculated so as to distribute the load substantially evenly among all of the array of the balls when the assembly (10) is supporting the weight of the vehicle. At the same time, this assures that during operation acceptable levels of noise and heat are maintained.

In order to secure the rings (25,27) in position, a gap, generally designated by the reference numeral (30), is provided between the two opposed annular faces of the rings (see FIG. 3). It is important to note that the two faces are full and unobstructed and are adapted to receive a split annular keeper (31) in a unique manner.

The amount of preload force on the bearing B is advantageously provided by the split, annular keeper (31) being slightly larger in cross section (in the axial direction) than the gap (30) before the preload force is applied. In effect, the compressive force on the keeper (31) determines and controls the amount of bearing preload force. This relationship constantly urges the opposed faces of the rings (25,27) apart, as shown by the action arrow $A_5$ in FIG. 3. Once in position, this compressive force securely holds all of the component parts of the bearing assembly (10) together in an efficient and very unique way. By selecting a matched ground and finished split keeper (31) with just the right cross sectional dimension to fill the gap (30), the optimal parameters outlined above are assured of being attained. In order to complete the spindle/bearing assembly, all that needs to be done is to place the thin metal or plastic cap (32) in position to isolate the parts and the grease packing on the interior from outside contamination. At the opposite end, a conventional rotary seal (33) can be provided (see FIGS. 1 and 2).

As mentioned above, when the concept of the present invention is adapted for use with a driven wheel of a vehicle, the structure is basically the same. Accordingly, as illustrated in FIG. 4, the components have been similarly numbered but distinguished by addition of a prime. Thus, to review briefly, in this embodiment of the invention, the spindle/bearing assembly (10') includes a hollow spindle (11') having an internal splined opening (40) to receive the axial stub shaft from the vehicle driving unit, which typically extends from a constant velocity/Rzeppa joint (not shown). The stub shaft is secured in position by applying a washer/nut combination (not shown) that fits within the cut-out opening (41).

A first outer support ring (25') includes apertures (26') (one shown in FIG. 4) for mounting to suitable structure supported by the steering knuckle (not shown) of the vehicle. The second, telescoping support ring (27') is received within the support ring (25') and is installed in the same manner and adjusted to provide the preload force that is required during assembly. The split annular keeper (31') is held captive between the opposed faces of the two support rings (25',27') thereby establishing the final preload force for the most efficient rolling action as well as securing the rings together relative to each other. The dual annular arrays of antifriction elements or balls (20',21') are held captive in the same manner as explained above.

The sealing cap (32') of formed metal or plastic cooperates with a similar formed ring (42) securely mounted to the hollow spindle (11') adjacent the distal end (15). In between the cap (32') and the formed ring (42) is positioned a seal element (43). As is apparent, an appropriate seal (44) is also provided at the opposite end of the spindle (11') adjacent the mounting flange (13').

As mentioned above, substantial advantages are realized in not only simplification of the design of the spindle/bearing assemblies (10,10'), but also in the manner in which the design incorporates features for ease of fabrication and assembly. First, it is noted that the unitary spindle (11,11') is not formed in steps, tapering toward the distal end (15,15') with multiple grooves and under cuts that are expensive to machine. The first step requires only that two identical pathways (17,18) be formed on the outer face of the substantially constant diameter bearing section (12) (see in particular FIG. 2, and also compare FIG. 4 in this and the following steps).

The second step is to apply the first array of antifriction balls (20) and the cage (22), with the balls seated around the periphery of the pathway (17). Next, with the seal (33) already in position, the first support ring (25) is placed over the distal end (15) of the spindle (11), and moved axially so that the mating pathway (28) is fully engaged with the balls (20) (see FIG. 2). Next, using heat if necessary in the manner as indicated above and as known in the art, the second outer support ring (27) is telescoped into position so as to be in the fully retracted relationship (see full line showing in FIG. 2 and the dotted line showing in FIG. 3).

At this point, it should be noted that the assembly of these component parts can be easily carried out with automated equipment. The components, especially the support ring (27) are relatively large, compared to the counterpart components including the support ring of the previous commercial design, as represented in the prior '167 patent. In this respect, the robotic equipment can more easily engage components, such as by the outer periphery of the ring (27) having annular groove (45) for this purpose.

In the fully telescoped or retracted position, the total clearance between the mating pair of pathways (18,29), which has an axial and radial component, is sufficient to provide easy access for loading of the array of balls (21), and simultaneously applying the cage (23) for proper spacing.

Once this is accomplished, the ring (27) is telescoped outwardly and provided with the proper preload force as represented by the action arrow $A_4$ in FIG. 3. The gap (30) is now open so that then the split keeper (31) is inserted and fully seated.

As illustrated in FIG. 2, one half of the split keeper is shown; it being understood that a second half is provided so that the ring (31) is in effect a full peripheral ring member. The appropriate sizing of the split keeper (31) with respect to the gap (30) determines the amount of preload force that is applied across the bearing B. Finally, the cap (32) is placed over the end of the ring (27) and the assembly is complete. Of course, as thus described with respect to FIGS. 2 and 3 for the non-driven wheel embodiment, the steps of assembly are essentially the same for the driven wheel embodiment of FIG. 4.

Figure 5:
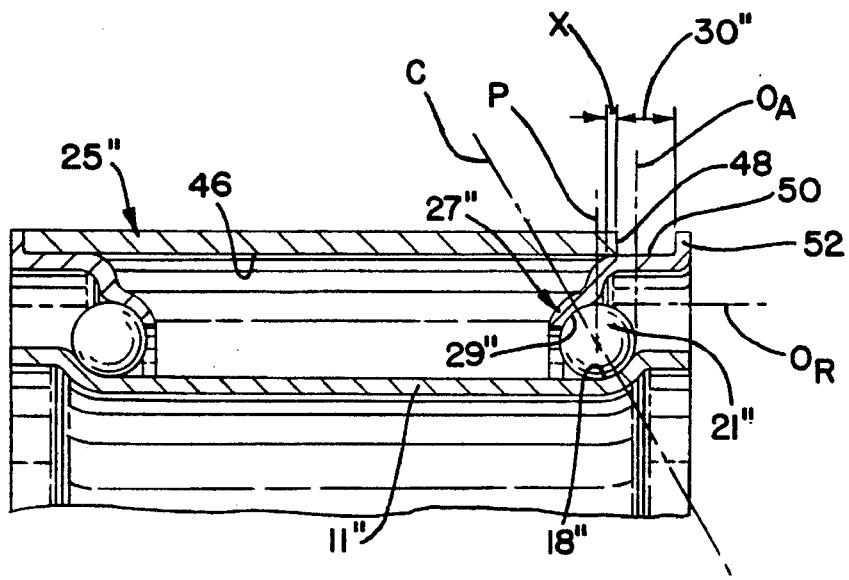
FIG. 5 is the prior art bearing described above.
Figure 6:
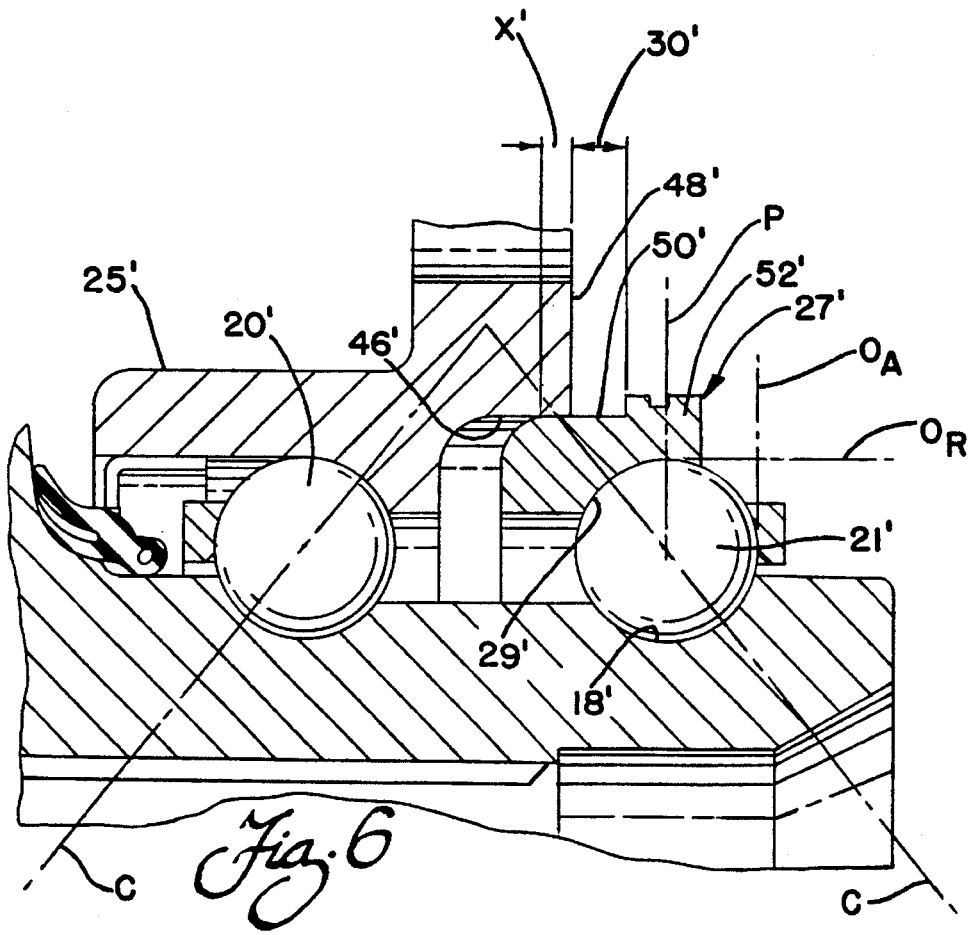
FIG. 6 is an enlargement of part of FIG. 4. Reference will now be made in detail to the present preferred embodiment of the invention, an example of which is illustrated in the accompanying drawing.

Referring to FIG. 6, extra detail of the FIG. 4 embodiment is described. FIG. 6 is identical to 4, but the split keepers (31) and seal (32') removed for simplicity, and numbers correspond as closely as possible to analogous structure in FIG. 5 for ease of comparison. The contact cone C of the last installed ball row (21') is indicated, as well as its pitch plane P, and the surface $O_R$ and plane $O_A$ that indicate its radial and axial outermost envelope. The outer race (25') has a primary, radially inwardly facing cylindrical surface (46') that extends axially outwardly from a point between the ball rows (20', 21') to a radially outwardly extending outer face or edge (48') located just axially outboard of and proximate to C. Therefore, the contact cone C intersects primary surface (46'). Edge (48') is located substantially axially inboard of $O_A$, since it is just outboard of C. Surface (46') is also located radially proximate to OR, spaced less than a radius of ball (21') away. The separable race piece (27') has a secondary, radially outwardly facing cylindrical surface (50') closely matching (46') and extending, in the fully assembled position shown, from a point between the ball rows (20', 21') to a shoulder (52') that is approximately centered on P. The area of mutual axial overlap X' between the surfaces (46') and (48') is substantially wider than its equivalent X in FIG. 5. Most important of all, the overlap area X' lies right at and on the contact cone C, which gives an advantage both in terms of compactness and load bearing ability.

As far as compactness, the axial inboard location of the axial overlap X', and the corresponding axial inboard location of shoulder (52'), means that the axial inward shift of race piece (27') that is necessary to create sufficient ball installation clearance between the pathways (29', 18') can be located entirely within the same small angle subtended between P and C, axially inboard of P, and radially proximate to $O_R$. Specifically, that shift is embodied in the axial gap (30'), which is in fact a little wider than the minimal shift needed. Every surface of race piece (27') can therefore be located well inboard of $O_A$, making it and the overall bearing package very compact, both radially and axially, relative to the ball row (21'). As far as load bearing ability, the overlap X' is located right on the cone C, where it can efficiently and directly transmit loads between piece (27') and ring (25'). The secondary surface (50') fits within primary surface (46') closely, with insignificant radial play. Once the axial gap (30') is solidly filled to also remove axial play, the support ring (25') and separate race piece (27') cooperate together to give a load supporting potential that is effectively as good as if (25') and (27') were solid and integral. The resulting bearing is suitable for a vehicle wheel bearing, therefore, from both the load support and compactness standpoint.

In summary, the results and advantages of the present invention can now be fully envisioned. A wheel spindle/ bearing assembly (10) and a related bearing assembly B are provided in which the focus on design simplicity and the ease of fabrication and assembly is apparent. Minimum machining is required, such as on the bearing section (12) of the spindle (11), since the multiple steps and grooves of the prior design (as illustrated in the '167 patent) are eliminated. Furthermore, all of the operations can be performed by automated/robotic equipment and the entire process is greatly simplified eliminating several steps that were previously required. The telescoping action of the ring (27) with respect to the ring (25) simplifies the introduction of the correct amount of preload force, with no diminution in the final product. The split keeper (31) when placed in position between the opposed faces between the rings (27,25), not only gives the proper preload, but also assures the assembly (10) is fully secured. There is no requirement that an additional retainer sleeve be included, as in the prior art.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

The embodiments of the invention in which an exclusive property or privilege is claimed are defined as follows:

1. A method for manufacturing and assembling an angular contact ball bearing of the type having a pair of ball rows arranged on pitch circles that define a pitch circle plane respective to each ball row and a pair of races disposed about a central axis, one race having a pair of axially outwardly facing ball pathways each of which is diagonally opposed to a respective one of a pair of axially inwardly facing ball pathways on the opposite race with a respective one of said rows of bearing balls engaged between each pair of diagonally opposed pathways along a respective one of a pair of oppositely sloped contact cones that form acute angles with said pitch circle planes, each pair of diagonally opposed pathways defining a clearance therebetween smaller than the ball diameter, and in which the axially outwardly facing ball pathways on said one race are both located axially inboard of the pitch circle planes of said ball rows so that moving either of said axially outwardly facing ball pathways axially apart from it's opposed pathway by a predetermined shift will enlarge the clearance therebetween to equal the ball diameter, comprising the steps of, selecting a ball row to be installed last, providing said one race with a primary cylindrical surface coaxial to said central axis and extending axially continuously from a point located between said ball rows to a radially extending outer edge located axially outboard of said selected ball row's contact cone, so that said contact cone intersects said primary cylindrical surface, providing a separate race piece that includes the axially outwardly facing pathway of the pair of diagonally opposed pathways respective to said selected ball row, said separate race piece having a secondary cylindrical surface thereon that closely radially engages within said primary cylindrical surface and which, when its pathway is engaged with said selected ball row and extends axially continuously from a point located between said ball rows to a radially extending outer edge that is axially spaced from said one race outer edge by at least said predetermined shift, so that the contact cone respective to said selected ball row also intersects said race piece secondary cylindrical surface at an area of close engagement with said one race's primary cylindrical surface, assembling the other of said ball rows between its opposed pathways, orienting said separate race piece coaxially to said central axis, sliding said separate race piece secondary cylindrical surface axially inwardly along said one race cylindrical primary cylindrical surface by at least said predetermined shift, thereby creating a clearance between the pathways of said selected ball row that is at least as large as said ball diameter, assembling said selected ball row against its axially inwardly facing pathway, sliding said separate race piece axially outwardly until its axially outwardly facing pathway engages said selected ball row, and, installing a rigid ring member axially solidly between said one race and said separate race piece outer edge, whereby said selected ball row is solidly engaged radially and axially between its diagonally opposed pathways in solid, load bearing engagement with both said separate race piece and said one race.

* * * * *